Inventor:
Carl Schurmann

June 15, 1926.

C. SCHURMANN

CLUTCH

Filed Sept. 18, 1920

1,589,236

2 Sheets-Sheet 2

Inventor:
Carl Schurmann

Patented June 15, 1926.

1,589,236

UNITED STATES PATENT OFFICE.

CARL SCHURMANN, OF DUSSELDORF, GERMANY.

CLUTCH.

Application filed September 18, 1920, Serial No. 411,301, and in Germany February 23, 1920.

The present invention relates to a special kind of clutch, in which the rotary motion of the driving part is transmitted to the driven part by means of a coiled, helical spring in such a manner that the said spring, in the one direction of rotation of the driving part will, by its circumferential friction, be unwound and thereby bind tightly to the driving and the driven parts, respectively, whereas, in the opposite direction of rotation, it will, by its circumferential friction wind closer together and thereby withdraw from the driving and the driven parts, respectively.

Figure 1:
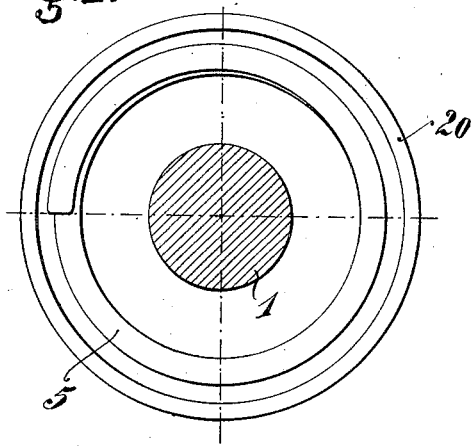
Figure 3:
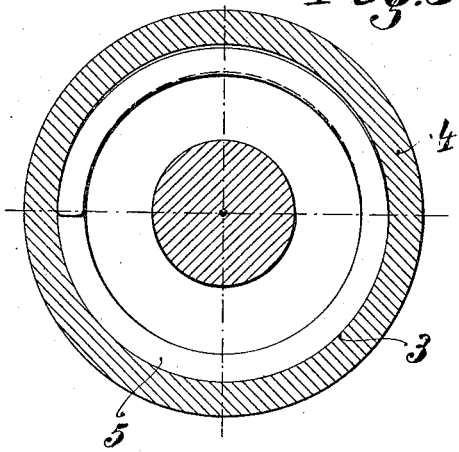
Figure 2:
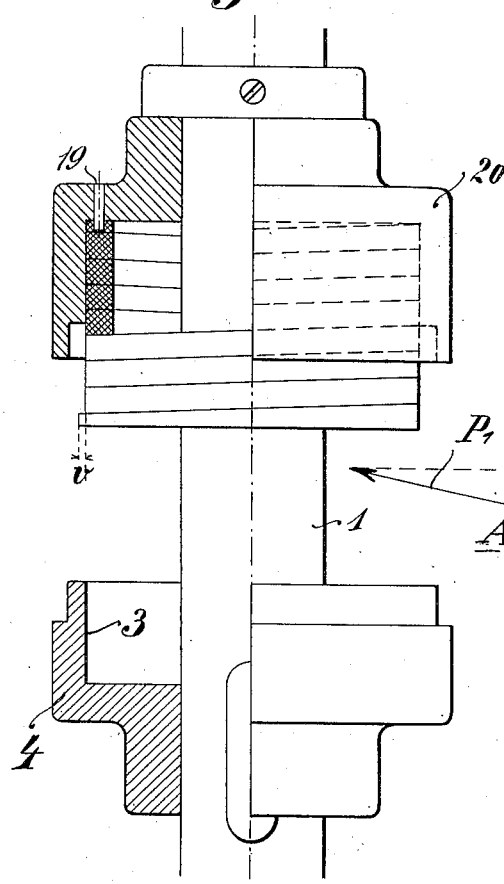
Figure 4:
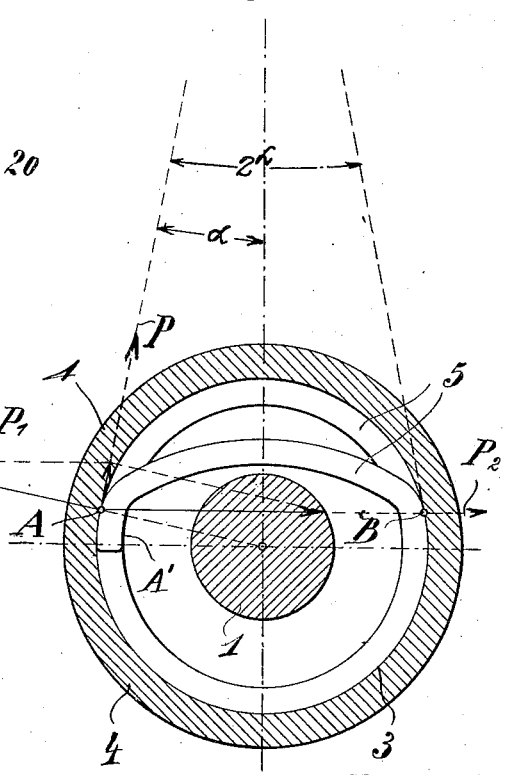
Figure 5:
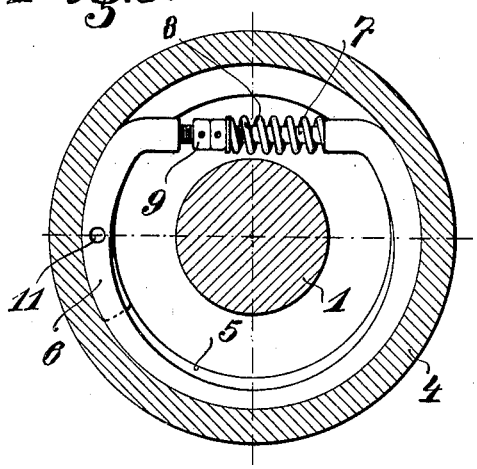
Figure 7:
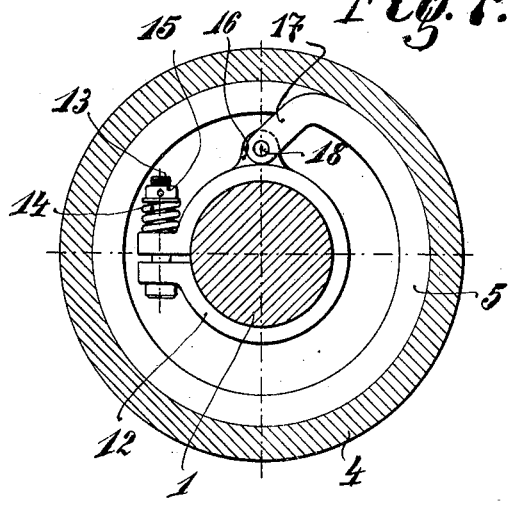
Figure 8:
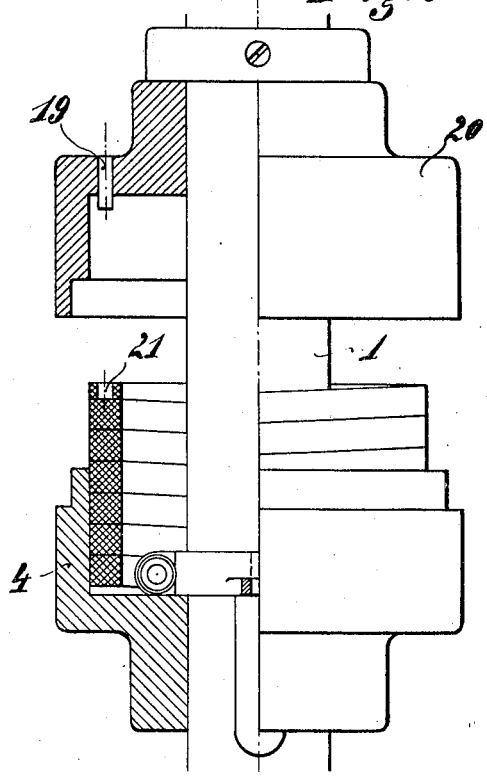

In clutches of the kind described the amount of the torque transmitted by the spring does not depend only on the diameter of the spring and its sectional area, but mainly on the effective number of turns of the spring which engage the driving and driven parts, because the torque will increase with increase in the number of turns, i. e. the effective length of the spring. In consequence thereof it is imperative that in the operation of the spring, the commencement of its circumferential friction, start at its free end. This condition may, on the one hand be secured by a suitable construction of the spring, and, on the other hand, by a special auxiliary member which acts on the end of the spring and forces the spring to expand when the driving part is revolving in the coupling direction. Several satisfactory embodiments of this invention are illustrated in the accompanying drawings, in which Figure 1 is a face view of one of the clutch members and the coupling spring, with the shaft shown in section and the free end of the spring in the released position it takes before its insertion into the other clutch member; Fig. 2 is partly a plan view and partly a horizontal section of the complete clutch and its shaft, the two clutch members being shown separated for the sake of clearness, it being understood that in actual use these members are fitted close together; Figs. 3 and 4 are cross-sections of the second clutch member and of the shaft, showing also the spring in position within said member, and Fig. 4 illustrating certain relations of forces; Figs. 5 and 7 are cross-sections of two other forms of my invention, and Figs. 6 and 8 are plan views of said forms, with parts in section, the two clutch members being shown separated in Figs. 6 and 8, as in Fig. 2, it being understood that in the use of the clutch its two members are close together, and that the two clutch members have no axial relative movement after the device has been assembled.

The Figures 1 and 2 in the accompanying drawing show, by way of example, a helical spring 5, in which approximately the last half of the final convolution at one end of the spring is flattened on an elliptical arc or on an arc eccentric to the axis of the spring, so as to produce a noncontacting bowing section between the points A—B, and a contacting free end at A', in consequence whereof the free end A' of the spring projects tangentially to and by an amount $v$ beyond the cylindrical surface of the spring. Accordingly when such a spring is fitted into the clutch sleeve its end will press with a greater force against the inside wall of such sleeve, and, at the same time, as may be seen in Fig. 3, there will be a gap in the contact between the end of the spring and the point B, at which the flattened curve or curve of eccentricity of section A—B commences. This gap in the contact has the following effect. The frictional force P acting, see Fig. 4, through end A' beyond point A of the spring, produced by the sleeve turning to the right hand relatively to the spring (or by the spring turning to the left hand relatively to the sleeve, will be transmitted into a binding pressure P of such convolution of the spring against one side of the sleeve and a binding pressure $P_2$ of such convolution of the spring against the opposite side of the sleeve beyond the point B in the direction A—B. The non-contacting section of the spring A—B will therefore be drawn in after the fashion of a wedge, the angle of which is the tangential angle $2\alpha$, causing expansion of the spring along a diametric line producing simultaneously two points of binding pressure. The smaller the angle $\alpha$, i. e. the more nearly the points A and B are diametrically opposite to each other, the greater will be the pressures at the points $P_1$ and $P_2$, relatively to the operative force P. By suitably locating the points A and B, the torque to be transmitted by an otherwise cylindrical spring may be increased up to the ultimate load of the spring section.

The bend, and the gap in the contact surface may, obviously, as evident from Fig. 4, be arranged in various manners.

Figure 6:
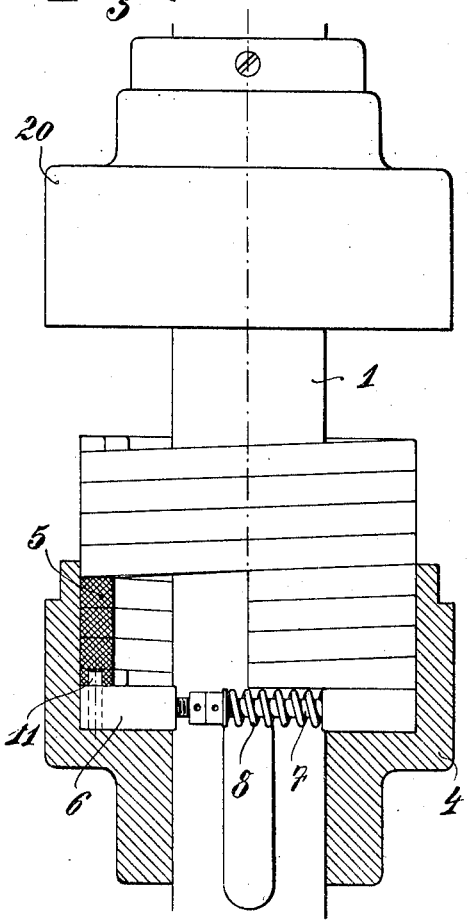

A constructional form of a spring, the end of which is operated by an auxiliary member is shown in Fig. 5 in transverse section and in Fig. 6 partly in plan view and partly in longitudinal section. In the present instance the said auxiliary member consists of a split ring 6, between the ends of which is fitted a screw bolt 7, which is shiftably fitted into the one end. On this bolt is fitted a helical spring 8, which bears against the movable end of the ring and the nuts 9 on the bolt. The spring 8, thus, tends to force the ring apart and cause it to bind with maximum force at two diametrically opposite points against the casing 4. By turning the nuts 9 the pressure produced by spring 8 may be regulated. The end of the helical spring 5 is secured by means of a pin 11, or in some other suitable manner to the friction ring. The operating force at the end of the spring is in this instance equal to the frictional moment of the auxiliary member 6. As the same may be chosen of any size, the number of turns in the spring may, for the same torque, be accordingly reduced.

When the available space within the casing 4 is, in axial direction, too small for employing this kind of auxiliary member, the latter may, also, be disposed within the helical spring 5 on the axis 1 of the casing section. This embodiment is shown in Fig. 7 in transverse section, and in Fig. 8 partly in plan view and partly in longitudinal section. In this embodiment the auxiliary member, a split ring 12, is held by a screw bolt 13 with a spring 14 and a nut 15 on the shaft 1, on which the casing 4 is fitted. The ring 12 has an eye 16, to which the end 17 of the spring 5, suitably bent outward, is hinged secured by aid of a pin 18.

The other end of the spring may, in all constructional forms be coupled by means of a pin 19 to the other clutch member 20, by said pin engaging in a hole 21 at the end of the spring. This clutch member may be made in the form of a sleeve or a flange, or as a collar on the shaft 1, or may also be fitted on a separate shaft in the same direction, as the local conditions, under which the clutch is to work, may require. With this construction the binding pressure instituted at one side and adjacent to one end of the auxiliary member is transmitted diametrically to the opposite side of the member, whereby a double binding action is set up. In Figures 2, 6 and 8 the one clutch member is shown drawn off from the spring 5.

The increased pressure at the end of the spring, or the use of an auxiliary member, respectively have the further advantage that the outside diameter of the cylindrical spring need not be larger than the bore of the clutch sleeve, so that the frictional moment, when the clutch is running idle, viz reversing, is greatly reduced. The outside of the spring may even be of a somewhat smaller diameter than the bore of the clutch sleeve.

The clutches illustrated herein may be employed in various manners, and for the sake of explanation I may assume, as an example, the case in which the clutch member 20 forms a pulley loose on the shaft 1, to which the clutch member 4 is keyed so as to rotate therewith always. Such pulley may be the driving member, and the shaft the driven member, or vice versa. In either event, rotation of the driving member in one direction will allow the spring 5 to slip circumferentially, so that there will be no driving connection between the parts 4 and 20, while, when the driving member rotates in the opposite direction, the spring 5 (either by itself or with the aid of supplemental devices such as those shown in Figs. 5 to 8) will couple the members 4 and 20 for rotation in unison. To uncouple these members, all that is necessary is to reverse the direction of rotation of the driving member.

I claim:

1. A clutch consisting of two relatively rotatable members, and a helical spring operatively engaging one of said members and operative to frictionally engage the other member to couple said members for rotation in one direction, said spring being provided at its free end with pressure surfaces at diametrically opposite points acting under stress in one direction of relative rotation of said clutch members to engage and press against the second-named clutch member with greater elastic force than the body portion of the spring.

2. A clutch consisting of two relatively rotatable members, a coiled spring operatively engaging one of said members and operative to frictionally engage a surface of the other member so as to couple said members for rotation in one direction, and an auxiliary member connected with the free end of said spring and spring pressed into frictional engagement with said surface.

3. A clutch consisting of two relatively rotatable members, a coiled spring operatively engaging one of said members and projecting into the other member to engage the inner surface thereof frictionally and couple said members for rotation in one direction, and an auxiliary spring-pressed member connected with the free end of said spring and urging said free end outwardly.

4. A clutch consisting of two relatively rotatable members, a coiled spring operatively engaging one of said members and projecting into the other member to engage the inner surface thereof frictionally and couple said members for rotation in one direction, an auxiliary friction member connected pivotally with the free end of said spring, and a separate spring acting on said auxiliary member.

5. A clutch consisting of two relatively rotatable members, a coiled spring operatively engaging one of said members and engaging the other member frictionally, an auxiliary friction member connected loosely with the free end of said spring, another spring for pressing said auxiliary member into frictional engagement with the member to be coupled with it during rotation in one direction, and means for varying the tension of the last named spring.

6. A clutch, comprising a helical friction spring, a clutch member, provided with a cylindrical recess into which said spring extends, a second clutch member rotatable relative to said first-named clutch member and operatively engaging said spring, and auxiliary friction means coupled to the spring and spring-pressed into frictional engagement with said first-named clutch member.

7. A clutch, comprising two relatively rotatable members having mating recesses in their adjacent faces, and a helical spring located in said recesses and extending from one to the other, said spring being provided with means tending to cramp the last half-turn at an end into more firm engagement than the intermediate spring part with the walls of its recess.

In testimony whereof I affix signature.

CARL SCHURMANN.